(12) United States Patent
Gumaste et al.

(10) Patent No.: US 12,131,595 B2
(45) Date of Patent: Oct. 29, 2024

(54) SYSTEMS AND METHODS FOR IDENTIFYING FIELD-REPLACEABLE UNITS USING A DIGITAL TWIN

(71) Applicant: Cummins Inc., Columbus, IN (US)

(72) Inventors: Rohan Achyut Gumaste, Louisville, KY (US); Michael Haas, Columbus, IN (US); Tara L. Hemami, Columbus, IN (US); Krithika Mohan, Columbus, IN (US); Veronica Susan Perks, Greenwood, IN (US); Shakti Saurabh, Columbus, IN (US); Jeffrey David Selwyn Diwakar Abraham, Columbus, IN (US)

(73) Assignee: Cummins Inc., Columbus, IN (US)

( * ) Notice: Subject to any disclaimer, the term of this patent is extended or adjusted under 35 U.S.C. 154(b) by 275 days.

(21) Appl. No.: 17/762,717

(22) PCT Filed: Sep. 22, 2020

(86) PCT No.: PCT/US2020/051926
§ 371 (c)(1),
(2) Date: Mar. 22, 2022

(87) PCT Pub. No.: WO2021/061603
PCT Pub. Date: Apr. 1, 2021

(65) Prior Publication Data
US 2022/0398876 A1  Dec. 15, 2022

Related U.S. Application Data

(60) Provisional application No. 62/904,090, filed on Sep. 23, 2019.

(51) Int. Cl.
G07C 5/08 (2006.01)
G06F 30/20 (2020.01)
G06F 119/02 (2020.01)

(52) U.S. Cl.
CPC .......... G07C 5/0808 (2013.01); G06F 30/20 (2020.01); G07C 5/0816 (2013.01); *G06F 2119/02* (2020.01)

(58) Field of Classification Search
CPC .. G07C 5/0808; G07C 5/0816; G07C 5/0841; G07C 5/008; G06F 30/20; G06F 2119/02
See application file for complete search history.

(56) References Cited

U.S. PATENT DOCUMENTS

| 6,246,950 B1 | 6/2001 | Bessler et al. |
| 8,109,079 B2 | 2/2012 | Wills et al. |

(Continued)

OTHER PUBLICATIONS

International Search Report and Written Opinion for International Application No. PCT/US2020/051926, dated Jan. 12, 2021 (8 pages).

(Continued)

*Primary Examiner* — Calvin Cheung
(74) *Attorney, Agent, or Firm* — FOLEY & LARDNER LLP

(57) ABSTRACT

A computing system is structured to receive operating data provided by a telematics circuit associated with a remote engine. The operating data comprises information provided by at least one sensor and/or at least one actuation command. The computing system is structured to determine, based on the operating data, a plurality of field-replaceable units (FRUs) associated with the operating data. The computing system is structured to generate a computer-based simulation corresponding to at least one degradation level for an FRU from the plurality of FRUs, identify a most probable failure, and rank the computer-based simulations across the plurality of FRUs. The computing system is structured to generate an electronic notification comprising data associated with the most probable failure and transmit the electronic notification to a computing device.

20 Claims, 7 Drawing Sheets

(56) References Cited

U.S. PATENT DOCUMENTS

| | | |
|---|---|---|
| 8,333,062 B2 | 12/2012 | Sun |
| 8,474,248 B2 | 7/2013 | Sun et al. |
| 9,133,749 B2 | 9/2015 | Gady et al. |
| 9,435,244 B1 | 9/2016 | Devarakonda |
| 9,803,532 B2 | 10/2017 | Li et al. |
| 2004/0016804 A1 | 1/2004 | Namaky et al. |
| 2006/0036403 A1 | 2/2006 | Wegerich et al. |
| 2010/0281855 A1 | 11/2010 | Sun et al. |
| 2011/0154097 A1 | 6/2011 | Barlow et al. |
| 2013/0317694 A1 | 11/2013 | Merg et al. |
| 2014/0082417 A1 | 3/2014 | Barton et al. |
| 2015/0269793 A1* | 9/2015 | Collins ................ B60W 50/04 701/31.4 |
| 2016/0035150 A1 | 2/2016 | Barfield et al. |
| 2016/0333760 A1 | 11/2016 | Blomgren et al. |
| 2018/0278055 A1 | 9/2018 | Shaik et al. |
| 2019/0266295 A1 | 8/2019 | Masuda et al. |

OTHER PUBLICATIONS

Extended European Search Report for EP Appl. No. 20867326.9, dated Aug. 1, 2023.

\* cited by examiner

SYSTEMS AND METHODS FOR IDENTIFYING FIELD-REPLACEABLE UNITS USING A DIGITAL TWIN

CROSS-REFERENCE TO RELATED PATENT APPLICATION

This application claims priority to and the benefit of U.S. Provisional Application No. 62/904,090 titled "SYSTEMS AND METHODS FOR IDENTIFYING FIELD-REPLACEABLE UNITS USING A DIGITAL TWIN," filed Sep. 23, 2019, which is incorporated herein by reference in its entirety.

TECHNICAL FIELD

The present disclosure relates to a telematics-based control and diagnostics system for a vehicle. More particularly, the present disclosure relates to systems and methods for identifying field-replaceable units of an engine using its digital twin. The digital twin may be remotely disposed relative to the counterpart engine and vehicle.

BACKGROUND

A vehicle may use a variety of sensors to monitor real-time operating conditions of an engine of the vehicle. The information provided by the sensors can be used to perform diagnostics by a controller (e.g., an engine control unit (ECU)) on the engine, vehicle, or various sub-systems. Some ECUs are modularly structured.

In diagnosing an indicated problem with an engine, vehicle, or sub-system, manual pinpoint testing is often necessary to isolate a problem down to the specific part or parts that need to be replaced. Pinpoint testing may include using manual methods to evaluate the health of various individual component parts, which results in substantial vehicle downtime, labor costs, and warranty costs.

SUMMARY

One example embodiment relates to a computing system. The computing system comprises a processor and a memory having computer-executable instructions stored therein that, when executed by the processor, are structured to cause the computing system to perform various operations. The operations include receiving operating data provided by a telematics circuit associated with an engine system that is remotely disposed relative to the computing system. The operating data includes information provided by at least one sensor. The operations include, based on the operating data, determining a plurality of field-replaceable units (FRUs) associated with the operating data. The operations include generating a computer-based simulation corresponding to at least one degradation level for a FRU of the plurality of FRUs. The operations include identifying a most probable failure by ranking the computer-based simulations across the plurality of FRUs. The operations include generating an electronic notification comprising data associated with the most probable failure. The operations include transmitting the electronic notification to a computing device. Additional computational resources, on-board or off-board, can be used to help identify the specific components that need to be replaced or repaired. This can significantly reduce operational downtime, labor costs, and warranty costs.

In some embodiments, the operations include validating each computer-based simulation, including determining an expected error value of each computer-based simulation, and ranking each computer-based simulation according to the expected error value. In some embodiments, the expected error value according to the equation $$\sum_{i=1}^{N} w_i \frac{(Diff)_i}{(Test)_i},$$

where i is a number of each successive computer-based simulation for the degradation level for each FRU, N is a total number of successive computer-based simulations for the degradation level, Diff(i) is a cumulative difference between an output value of each computer-based simulation for a predetermined time period and its corresponding actual value determined based on the operating data, Test(i) is the cumulative actual value for the predetermined time period, and $w\_i=1/N$.

In some embodiments, the engine system is a first engine system, the FRU is a first FRU, and the instructions, when executed by the processor, are further structured to cause the computing system to perform additional operations. The operations include receiving additional operating data provided by a second telematics circuit associated with a second engine system. The operations include, based on the additional operating data, identifying a second FRU associated with a second engine system, wherein the second FRU and the first FRU correspond to a particular part. The operations include generating the computer-based simulation corresponding to at least one degradation level for the first FRU, wherein the computer-based simulation is based on the additional operating data for the second FRU.

In some embodiments, the notification includes a standardized code corresponding to the most probable failure. In some embodiments, the standardized code is an OBD-II code. In some embodiments, the standardized code is augmented to include an encoded error descriptor determined based on the computer-based simulation. In some embodiments, the notification comprises a service recommendation.

In some embodiments, the operating data further comprises at least one actuation command.

A second example embodiment relates to a method. The method includes receiving operating data provided by a telematics circuit associated with an engine system that is remotely disposed relative to the computing system. The operating data includes information provided by at least one sensor. The method includes, based on the operating data, determining a plurality of field-replaceable units (FRUs) associated with the operating data. The method includes generating a computer-based simulation corresponding to at least one degradation level for a FRU of the plurality of FRUs. The method includes identifying a most probable failure by ranking the computer-based simulations across the plurality of FRUs. The method includes generating an electronic notification comprising data associated with the most probable failure. The method includes transmitting the electronic notification to a computing device.

In some embodiments, the method includes validating each computer-based simulation, including determining an expected error value of each computer-based simulation, and ranking each computer-based simulation according to the expected error value. In some embodiments, the expected error value according to the equation $$\sum_{i=1}^{N} w_i \frac{(Diff)_i}{(Test)_i},$$

where i is a number of each successive computer-based simulation for the degradation level for each FRU, N is a total number of successive computer-based simulations for the degradation level, Diff(i) is a cumulative difference between an output value of each computer-based simulation for a predetermined time period and its corresponding actual value determined based on the operating data, Test(i) is the cumulative actual value for the predetermined time period, and w_i=1/N.

In some embodiments, the engine system is a first engine system, the FRU is a first FRU, and the method further includes receiving additional operating data provided by a second telematics circuit associated with a second engine system. The method includes, based on the additional operating data, identifying a second FRU associated with a second engine system, wherein the second FRU and the first FRU correspond to a particular part. The method includes generating the computer-based simulation corresponding to at least one degradation level for the first FRU, wherein the computer-based simulation is based on the additional operating data for the second FRU.

In some embodiments, the notification includes a standardized code corresponding to the most probable failure. In some embodiments, the standardized code is an OBD-II code. In some embodiments, the standardized code is augmented to include an encoded error descriptor determined based on the computer-based simulation. In some embodiments, the notification comprises a service recommendation.

In some embodiments, the operating data further comprises at least one actuation command.

A third example embodiment relates to computing system. The computing system includes a data management circuit, a simulation circuit, and a diagnostic circuit coupled to each other. The data management circuit is configured to receive operating data from a telematics circuit associated with an engine system that is remotely disposed relative to the computing system, the operating data comprising information provided by at least one sensor. The simulation circuit is coupled to the data management circuit and configured to: based on the operating data, determine a plurality of field-replaceable units (FRUs) associated with the operating data; and generate a computer-based simulation corresponding to at least one degradation level for a FRU of the plurality of FRUs. The diagnostic circuit is coupled to the simulation circuit and the data management circuit. The diagnostic circuit is configured to: identify a most probable failure by ranking the computer-based simulations across the plurality of FRUs; generate an electronic notification comprising data associated with the most probable failure; and transmit the electronic notification to a computing device.

In some embodiments, the operations include validating each computer-based simulation, including determining an expected error value of each computer-based simulation, and ranking each computer-based simulation according to the expected error value. In some embodiments, the expected error value according to the equation $$\sum_{i=1}^{N} w_i \frac{(Diff)_i}{(Test)_i},$$

where i is a number of each successive computer-based simulation for the degradation level for each FRU, N is a total number of successive computer-based simulations for the degradation level, Diff(i) is a cumulative difference between an output value of each computer-based simulation for a predetermined time period and its corresponding actual value determined based on the operating data, Test(i) is the cumulative actual value for the predetermined time period, and w_i=1/N.

In some embodiments, the engine system is a first engine system, the FRU is a first FRU, and the instructions, when executed by the processor, are further structured to cause the computing system to perform additional operations. The operations include receiving additional operating data provided by a second telematics circuit associated with a second engine system. The operations include, based on the additional operating data, identifying a second FRU associated with a second engine system, wherein the second FRU and the first FRU correspond to a particular part. The operations include generating the computer-based simulation corresponding to at least one degradation level for the first FRU, wherein the computer-based simulation is based on the additional operating data for the second FRU.

In some embodiments, the notification includes a standardized code corresponding to the most probable failure. In some embodiments, the standardized code is an OBD-II code. In some embodiments, the standardized code is augmented to include an encoded error descriptor determined based on the computer-based simulation. In some embodiments, the notification comprises a service recommendation.

In some embodiments, the operating data further comprises at least one actuation command.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of, methods, apparatuses, and systems for identifying field-replaceable units of an unhealthy engine using its digital twin. The various concepts introduced above and discussed in greater detail below may be implemented in any number of ways, as the concepts described are not limited to any particular manner of implementation. Examples of specific implementations and applications are provided primarily for illustrative purposes.

As used herein, the term "field-replaceable unit" ("FRU") generally refers to a diagnosable component (for example, of a vehicle). According to various embodiments, a FRU may comprise electronic and/or physical components, such as electronic control units, sensors, etc. For example, a FRU associated with an engine and/or an exhaust gas aftertreatment system may include actuators, pipes, valves, housings, adapters, sensors (e.g., a temperature sensor, a pressure sensor, an NOx sensor), catalysts, injectors, heaters, combinations thereof (e.g., turbochargers) and the like. FRUs may also include various control units (e.g., combinations of processors, memory, and/or circuits disposed on a circuit board, such as engine control units (ECU). An example ECU may include an engine control module (ECM), a powertrain control module (PCM), a brake control module (BCM), a transmission control module (TCM), a battery management system (BMS), etc.).

Referring to the Figures generally, the various embodiments disclosed herein relate to a computing system structured to receive operating data provided by a telematics circuit associated with a remote engine. The operating data comprises information provided by at least one sensor and/or at least one actuation command. The computing system is structured to determine, based on the operating data, a plurality of FRUs associated with the operating data. The computing system is structured to generate a computer-based simulation corresponding to at least one degradation level for a FRU from the plurality of FRUs, identify a most probable failure, and rank the computer-based simulations across the plurality of FRUs. The computing system is structured to generate an electronic notification comprising data associated with the most probable failure and transmit the electronic notification to a computing device.

Figure 1:
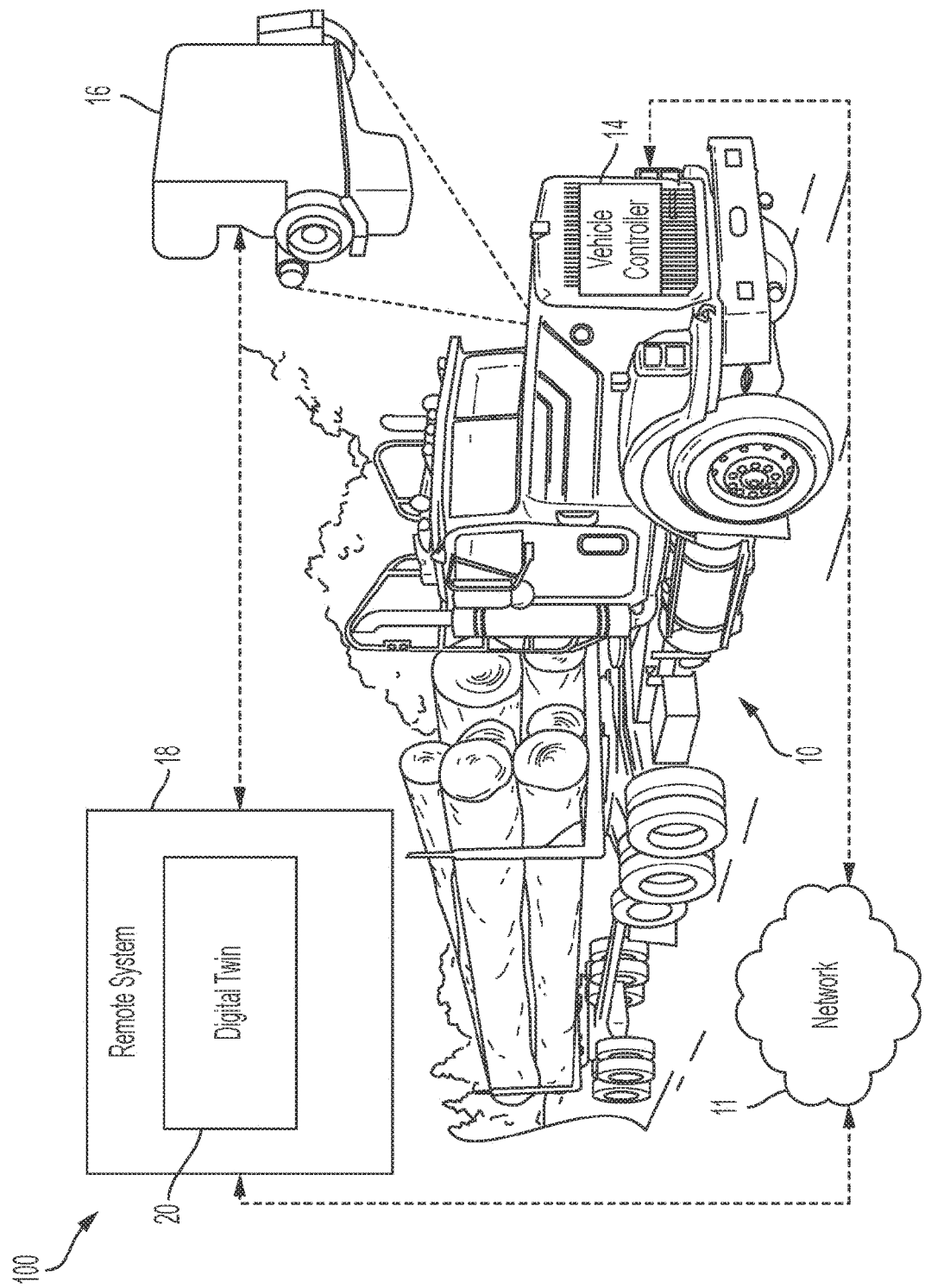
FIG. 1 is a is a perspective view of a vehicle in communication with a remote system, according to some embodiments.

Referring now to FIG. 1, a perspective view of a vehicle 10 in communication with a remote system 18 is shown, according to some embodiments. The vehicle 10 is structured for on-highway travel. As described herein, the concepts described herein are applicable with vehicles, such as the vehicle 10. However, one skilled in the art will recognize that the present disclosure is applicable to a wide variety of implementations. In other embodiments, the systems and methods discussed herein may be used in off-highway vehicles, generator sets, and other machinery (e.g., wheel loaders, dozers, generators, etc.).

The vehicle 10 includes a vehicle controller 14 structured to control, at least partly, operations of the vehicle 10 and to communicate with a remote system 18. For example, the vehicle controller 14 may control the operation of an engine, an aftertreatment and emissions control system, or another electronically controlled system of the vehicle 10.

The vehicle 10 includes an engine 16 structured to power the vehicle 10. The engine 16 may be a compression ignition engine (e.g., a diesel engine), a spark-ignition engine (e.g., a gasoline engine), or another type of prime mover (e.g., an electric or hybrid system).

The aftertreatment system may be structured to treat exhaust gases from the engine. The aftertreatment system may include a variety of components, such as a reductant dosing system, a catalyst, various flow conduits, a filtration system, etc. For example, according to some embodiments, an exhaust aftertreatment system for a diesel engine may include a diesel oxidation catalyst (DOC) to reduce or remove carbon monoxide from the exhaust stream, a diesel particulate filter (DPF) structured to reduce or remove particulate matter from the exhaust stream, and a selective catalytic reduction (SCR) component to reduce NOx levels in the exhaust stream.

The vehicle 10 further includes at least one actuator. The actuators (e.g., motors, pneumatics, servos, linear actuators, piezoelectric actuators, valves, regulators, etc.) are structured to control aspects of various vehicle systems (e.g., a fuel handling system, an air handling system, a transmission, a spark timing system, a braking system, a diesel exhaust fluid doser for a selective catalyst reduction aftertreatment system, etc.). For example, the actuators may include a fuel valve in a fuel injection system, an air valve in an air handling system, a diesel exhaust fluid (DEF) valve in a DEF dosing, and so on.

The vehicle 10 further includes a sensor array structured to provide signals to the vehicle controller 14 indicative of various operating parameters of the vehicle 10 (e.g., engine out exhaust gas temperature, engine out NOx levels, vehicle speed, engine torque, suspension travel distance, etc.). The sensor array can include physical sensors structured to directly measure operating parameters (e.g., O2 sensors, NOx sensors, temperature sensors, pressure sensors, strain gauges, etc.) and/or electronic programmable sensors structured to determine operating parameters based on the information collected by other physical sensors (i.e., virtual sensors). For example, a vehicle weight sensor may be structured to determine weight based on information received from a strain gauge of the vehicle 10. Additionally, the sensor array may be coupled to one or more user interfaces or controls (e.g., a steering wheel, an acceleration pedal, etc.) that provide signals indicative of a user input.

The remote system 18 of FIG. 1 is structured to receive information from the vehicle controller 14 and perform diagnostic, prognostic, and/or, in some embodiments, control operations on the vehicle. The remote system 18 includes one or more memory devices, processors, and circuits that comprise a digital twin 20. The digital twin 20 is structured to process the sensor information and the actuator input/output information from the vehicle 10 in the same or similar manner as the vehicle controller 14. In some embodiments, the digital twin 20 allows a plurality of parameters utilized by a control scheme of the vehicle controller 14 to be reproduced remotely. The reproduction of control parameters allows for a more thorough diagnostic analysis of the operation of the vehicle controller 14 and/or the vehicle 10. The vehicle controller 14 communicates the sensor information (i.e., inputs to the control scheme) and actuator inputs/outputs to the remote system 20. The digital twin 20 is then structured to perform diagnostics and prognostics remotely.

The vehicle controller 14 communicates with the remote system 18 via a network 11, which may include one or more wired connections or wireless connections. Wireless connections may include the Internet, Wi-Fi, cellular, radio, Bluetooth, ZigBee, etc. In some embodiments, the network 11 includes a controller area network (CAN). The remote system 18 and vehicle may comprise various equipment to facilitate and enable a wireless connection such as routers, cellular modems, Bluetooth transceivers, Bluetooth beacons, RFID transceivers, NFC transmitters, and the like. In some embodiments, the network 11 is, at least in part, a packet-switched network. Information transmitted between the vehicle controller 14 of the vehicle 10 and the remote system 18 may be segmented into packets and may be transmitted according to a suitable communications protocol, such as TCP/IP.

In some embodiments, the network 11 is optimized at least in part to support high throughput of data communicated between the vehicle controller 14 and the remote system 18.

Figure 2:
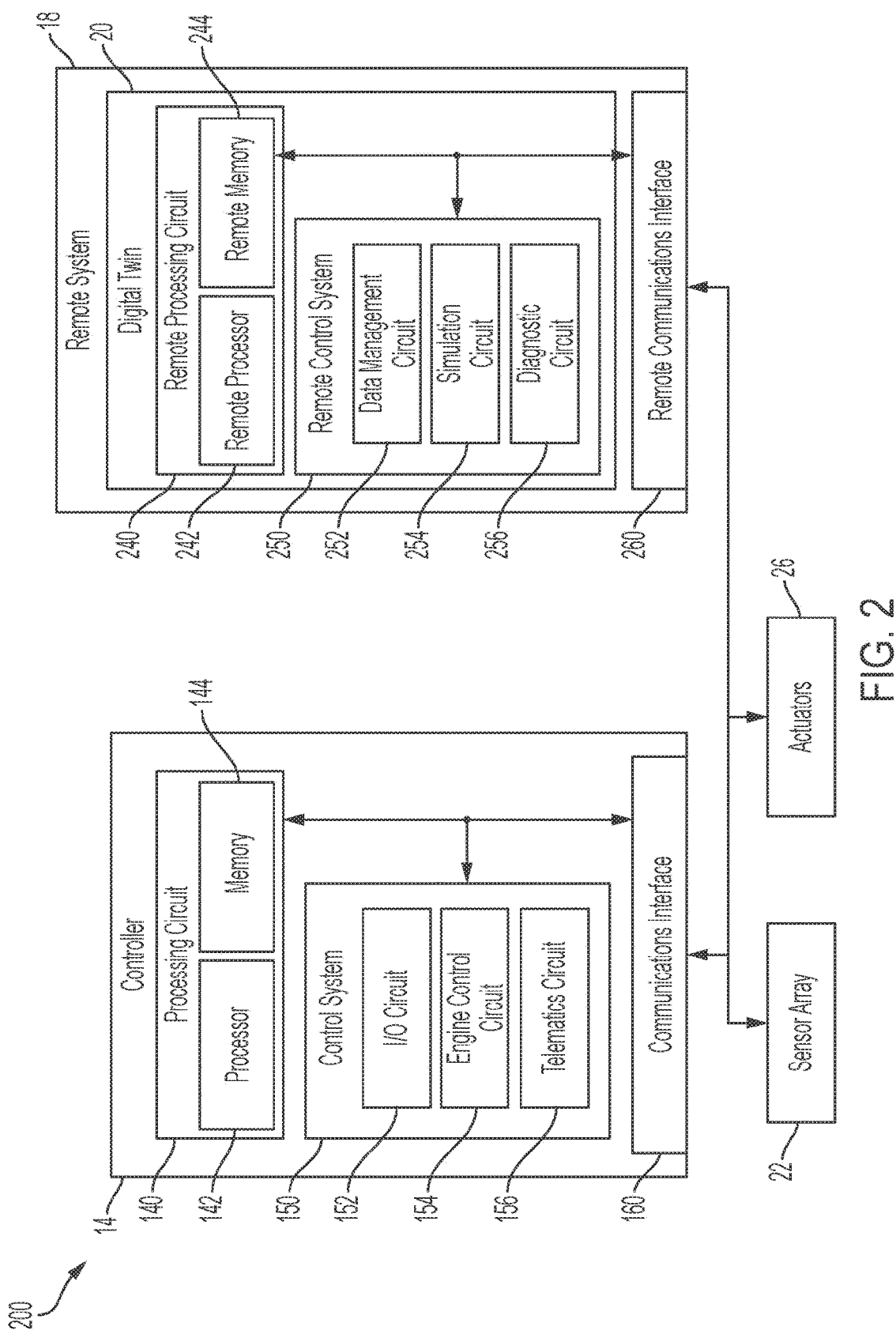
FIG. 2 is a schematic diagram of a controller of the vehicle of FIG. 1 and a controller of the remote system of FIG. 1, according to some embodiments.

Referring now to FIG. 2, is a schematic diagram of a vehicle controller 14 of the vehicle 10 of FIG. 1 and a digital twin (e.g., controller) 20 of the remote system 18 of FIG. 1 is shown, according to some embodiments.

As shown in FIG. 2, the vehicle controller 14 includes a processing circuit 140 having a processor 142 and a memory device 144, and a control system 150. The control system 150 includes an input/output circuit 152 structured to receive information from the sensor array 22 as well as to receive the control parameters and send instructions to the actuators 26. The control system 150 further includes an engine control circuit 154 structured to at least partly control the engine of the vehicle. The control system 150 further includes a telematics circuit 156 structured to package the sensor information and the control parameters for communication with the remote system 18 via the communications interface 160. Sensor information may include measured or determined data regarding operation of a component or system in the vehicle 10. Control parameters may include parameters that are used to control (e.g., activate, operate, etc.) the component or system in the vehicle 10 based at least in part on the sensor information.

Generally, the vehicle controller 14 is structured to control operation, at least partly, of one or more components and/or vehicle systems of the vehicle 10. The vehicle controller 14 may also be structured to perform one or more diagnostics and/or prognostics on one or more vehicle systems or components. The input/output circuit 152 collects information from the sensor array 22 including any user interfaces or controls, and the engine control circuit 154 determines control parameters that are provided to the actuators 26 via the input/output circuit 152 to control the component(s) or system(s) of the vehicle 10.

In one configuration, the input/output circuit 152, the engine control circuit 154, and the telematics circuit 156 are embodied as machine or computer-readable media that is executable by a processor, such as processor 142. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). In one example implementation, the frequency of acquisition and/or transmission of the data is between and including 10 ms and 1000 ms. The computer readable media may include code, which may be written in any programming language including, but not limited to, Java or the like and any conventional procedural programming languages, such as the "C" programming language or similar programming languages. The computer readable program code may be executed on one processor or multiple processors. In the latter scenario, the processors may be connected to each other through a suitable type of network (e.g., CAN bus, etc.).

In another configuration, input/output circuit 152, the engine control circuit 154, and the telematics circuit 156 are embodied as hardware units, such as electronic control units. As such, the input/output circuit 152, the engine control circuit 154, and the telematics circuit 156 may be embodied as one or more circuitry components including, but not limited to, processing circuitry, network interfaces, peripheral devices, input devices, output devices, sensors, etc. In some embodiments, the input/output circuit 152, the engine control circuit 154, and the telematics circuit 156 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the input/output circuit 152, the engine control circuit 154, and the telematics circuit 156 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The input/output circuit 152, the engine control circuit 154, and the telematics circuit 156 may also include programmable hardware devices such as field programmable gate arrays, programmable array logic, programmable logic devices or the like. The input/output circuit 152, the engine control circuit 154, and the telematics circuit 156 may include one or more memory devices for storing instructions that are executable by the processor(s) of the input/output circuit 152, the engine control circuit 154, and the telematics circuit 156. The one or more memory devices and processor(s) may have the same definition as provided below with respect to the memory device 144 and processor 142.

In the example shown, the vehicle controller 14 includes the processing circuit 140 having the processor 142 and the memory device 144. The processing circuit 140 may be structured or configured to execute or implement the instructions, commands, and/or control processes described herein with respect to the input/output circuit 152, the engine control circuit 154, and the telematics circuit 156. Thus, the depicted configuration represents the input/output circuit 152, the engine control circuit 154, and the telematics circuit 156 as machine or computer-readable media. However, as mentioned above, this illustration is not meant to be limiting as the present disclosure contemplates other embodiments where at least one of the input/output circuit 152, the engine control circuit 154, and the telematics circuit 156 is configured as a hardware unit. All such combinations and variations are intended to fall within the scope of the present disclosure.

The processor 142 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor 142 also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits (e.g., input/output circuit 152, the engine control circuit 154, and the telematics circuit 156) may comprise or otherwise share the same processor which, in some example embodiments, may execute instructions stored, or otherwise accessed, via different areas of memory. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 144 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 144 may be communicably connected to the processor 142 to provide computer code or instructions to the processor 142 for executing at least some of the processes described herein. Moreover, the memory device 144 may be or include tangible, non-transient volatile memory or non-volatile memory. Accordingly, the memory device 144 may include database components, object code components, script components, or any other type of information structure for supporting the various activities and information structures described herein.

The input/output circuit 152 is structured to receive sensor information from the sensor array 22 via the communication interface 160, which may be structured to support internal and/or external vehicle communications. The input/output circuit 152 may modify or format the sensor information (e.g., via an analog/digital converter) so that the sensor information can be interpreted and used by other circuits, such as the engine control circuit 154.

The engine control circuit 154 is structured to receive the sensor information from the input/output circuit 152 and determine control parameters based on the sensor information. As used herein, "control parameters" refer to values or information determined by embedded control logic, models, algorithms, or other control schemes. The "control parameters" are intermediate values or information relative to the inputs and outputs. In this regard, the control parameters may include values or information that represent a status or a state of a vehicle system or an exhaust aftertreatment system, a predictive state information, or any other values or information, or intermediate values or information used by the engine control circuit 154 to determine what the controller 14 should do or what the outputs should be. In some embodiments, the engine control circuit 154 generates tens of thousands of control parameters during operation. The "control parameters" are used to generate and determine an output that is transmitted to one or more actuators 26 for controlling a vehicle system of the vehicle 10.

In one embodiment illustrative of how the input/output circuit 152 and the engine control circuit 154 work together, the input/output circuit 152 provides sensor information (i.e., an operating parameter), such as an actual fuel flow rate measured by a sensor in a sensor array 22, to the engine control circuit 154. The operating parameters may be determined by the engine control circuit 154 according to any suitable method or technique, such as using a continuously modulated control schema where a measured operating parameter is periodically adjusted to a desired set point (e.g., PID), lookup tables, and the like. The operating parameters may be used to determine control parameters to achieve target operating parameters. For instance, in an example embodiment, the input/output circuit 152 receives a target operating parameter, such as a target fuel flow rate, from the engine control circuit 154. In response to receiving a desired set point (target operating parameter) for the target fuel flow rate, the input/output circuit 152 outputs a pulse-width-modulated signal (a control parameter) to a fuel injector to achieve the target fuel flow rate.

The telematics circuit 156 is structured to receive the sensor and actuation information from the input/output circuit 152. In some embodiments, the telematics circuit 156 receives the sensor information and the actuation information directly from the input/output circuit 152. In some embodiments, the input information and the actuation information is stored in the memory device 144 and the telematics circuit retrieves the sensor information and the actuation information from the memory device 144.

The telematics circuit 156 is structured to format the sensor information and actuation information into data packets that are sent to the remote system 18 via a network 11. The telematics circuit 156 is structured to connect and communicate with the remote system 18 via the communications interface 160. The communications interface 160 may include wired or wireless interfaces (e.g., jacks, antennas, transmitters, receivers, transceivers, wire terminals, etc.) for conducting data communications with various systems, devices, or networks. For example, the communications interface 160 may include a Wi-Fi transceiver for communicating via a wireless communications network. The communications interface 160 may be structured to communicate via local area networks or wide area networks (e.g., the Internet, etc.) and may use a variety of communications protocols (e.g., TCP/IP, local operating network (LON), controller area network (CAN), J1939, local interconnect network (LIN), Bluetooth, ZigBee, radio, cellular, near field communication, etc.).

In some embodiments, the vehicle controller 14 is a singular unit. In other embodiments, the vehicle 10 comprises multiple vehicle controllers 14. In some example configurations, the input/output circuit 152, the engine control circuit 154, and the telematics circuit 156 may be dispersed throughout separate physical locations in the vehicle and/or may be associated with separate processes, storage media, memory modules, and the like. Alternatively, and as shown, input/output circuit 152, the engine control circuit 154, and the telematics circuit 156 may be embodied in or within a single unit/housing.

Still referring to FIG. 2, a schematic diagram of the remote system 18 of the vehicle 10 of FIG. 1 is shown according to an example embodiment. Generally, the remote system 18 is structured to receive the data packets from the telematics circuit 156 of the vehicle controller 14, unpack the data packets, recreate the control logic of the engine control circuit 154 within the circuits of the digital twin 20, generate computer-based simulations of failures for parts of the vehicle 10 based on the data received from the telematics circuit 156, and utilize the outcomes of computer-based simulations for diagnostic analysis of the physical and/or electronic parts of vehicle 10. As shown, the remote system 18 includes a remote processing circuit 240 having a remote processor 242 and a remote memory device 244, a remote control system 250 having a data management circuit 252, simulation circuit 254 and diagnostic circuit 256.

The data management circuit 252 is structured to receive the sensor and actuator command information from the telematics circuit 156 of the vehicle controller 14. In some embodiments, the data management circuit 252 is structured to transmit the sensor and actuator command information to the telematics circuit 156 of the vehicle controller 14. The transmitted information may be based on the computer-based simulations performed based on the sensor and actuator command information received from the vehicle controller 14. In some embodiments, the data management circuit 252 is structured to transmit an electronic notification, generated based on the computer-based simulations, to a computing system.

The data management circuit 252 is structured to connect and communicate with the remote system vehicle controller 14 and other computing systems via the communications interface 260. The communications interface 260 may include wired (e.g., Ethernet card) or wireless interfaces (e.g., jacks, antennas, transmitters, receivers, transceivers, wire terminals, etc.) for conducting data communications with various systems, devices, or networks. For example, the communications interface 260 may include a Wi-Fi transceiver for communicating via a wireless communications network. The communications interface 260 may be structured to communicate via local area networks or wide area networks (e.g., the Internet, etc.) and may use a variety of communications protocols (e.g., TCP/IP, local operating network (LON), controller area network (CAN), J1939, local interconnect network (LIN), Bluetooth, ZigBee, radio, cellular, near field communication, etc.).

The simulation circuit 254 is structured to virtually recreate and/or modify the control logic of the engine control circuit 154 of the vehicle controller 14 and generate computer-based simulations of failures for parts of the vehicle 10 based on the data received from the telematics circuit 156. To that end, the simulation circuit 254 structured to use the sensor information, actuation information, and control parameters in computer-based simulations. In an example embodiment, each computer-based simulation in the set of computer-based simulations for each part includes a plurality of predicted outcomes, where each predicted outcome is represented as a design-of-experiments (DoE)-based simulation. In an example embodiment, each DoE scenario corresponds to a degradation level for a particular part. As an example, for some parts, such as valves and pipes, part failures may result from leaks, partial pathway obstructions, and the like, and each DoE in the set of DoEs for the part may correspond to a degradation level expressed in percentage terms (such as a 10% leak, a 10% obstruction, and the like.). As another example, a degradation level for an entire component may comprise various fault/degradation scenarios associated with different parts. For instance, a fault in an air flow path may be due to any or a combination of a leak in the corresponding piping structure, a restriction in the flow path, a malfunction of a sensor measuring oxygen levels, etc. In such an example, each DoE in the set of DoEs for the component may correspond to a particular part or subcomponent and, further, to a particular degradation level or fault scenario predicted for the particular part or a combination of parts.

The diagnostic circuit 256 is structured to utilize the outcomes of computer-based simulations for diagnostic analysis of the physical and/or electronic parts of vehicle 10. In some embodiments, the diagnostic circuit 256 is structured to determine an expected error value of each computer-based simulation (DoE scenario), rank a plurality of DoE scenarios based on the predicted error value, and generate an estimation for the most likely fault scenarios, degradation levels, etc.

In some embodiments, diagnostic circuit 256 is structured to generate an electronic notification based on the ranked computer-based simulations. In some embodiments, the notification includes an outcome of the computer-based simulation that corresponds to one or more likely fault/degradation scenarios. For example, the notification may include top N (e.g., top 1, top 3, top 5, top 10) likely fault conditions identified based by the computer-based simulation. In some embodiments, the notification may include part information (e.g., a part description, part identifier, part component information), performance parameter information, operating parameter information, and/or fault-related information (e.g., a fault description, an associated listing of affected parts, actual values for operating parameters, target values for operating parameters, degradation level for a partial failure (e.g., % leak), etc. The notification may be transmitted as an SMTP message (e.g., email), an SMS message (e.g., a text message), an API message (for example, a REST API message transmitted to a service management system at a customer support center), etc. In some embodiments, the remote system 18 includes an electronic database that cross-references warranty information, service history, downtime, and the like for a particular vehicle 10, cross-references part identifiers for a part or component in vehicle 10, etc. In some embodiments, the diagnostic circuit 256 may be structured to generate a service recommendation (e.g., full component replacement, partial FRU-level replacement, repair, etc.) based on the cross-referenced information. In some embodiments, the notification includes an OBD-II code corresponding to the estimated fault, degradation level, etc. Accordingly, telematics circuit 156 can be structured to collect and send the information sufficient to produce an OBD-II code, which may include the fault description (e.g., powertrain, chassis, body, network communication, etc.), system identifier (e.g., fuel and air metering, ignition system, auxiliary emission controls, vehicle speed control and idle control system, computer output circuit, transmission (gearbox), etc.), a designator denoting whether the OBD-II code is generic or manufacturer-specific, etc.

Conventional OBD-II codes do not include any indications of particular failures or components responsible for the failures. Thus, conventional OBD-II diagnostics merely assist a user in localizing a problem, and this is often done in a sequential fashion rather than by running multiple DoEs in parallel in a distributed manner, as disclosed herein. Accordingly, in some embodiments, the notification includes an augmented data item, such as an augmented OBD-II code, which may include an encoded error descriptor determined based on the computer-based simulation. In some embodiments, the remote system 18 may maintain a database comprising a cross-reference directory between a set of identifiers (e.g., codes, which can be numeric or alphanumeric) and error descriptions.

In some embodiments, the diagnostic circuit 256 is structured to analyze data across multiple parts for multiple vehicles 10 and to generate a service recommendation. Advantageously, in such embodiments, the digital twin 20 does not simply base a simulation on a diagnostic history of a particular engine 16 for a specific vehicle 10. Further, in some embodiments, the computer-based simulations are not paired with a single engine 16. For example, a set of computer-based simulations generated by a digital twin 20 may draw on historical information for multiple implementations, across different vehicles, of a particular part for a particular engine 16. This creates a one-to-many relationship between a digital twin 20 and a particular installation of a part on each of a plurality of vehicles 10, such that, for example, early failures in a small subset of vehicles 10 may be indicative of a need for a global recall. In another set of examples, a one-to-many relationship is created between a particular engine 16 and digital twins 20. For instance, a plurality of digital twins 20 may be created for a particular engine 16 of a vehicle 10. Each digital twin 20 in the plurality may be structured to provide different recommendations based on user-specified priorities, such as cost of repairs overall or for particular successive time periods (such as the first N years of operating the vehicle), total required useful life, depreciation, maximum allowed downtime, etc.

In one configuration, the data management circuit 252, simulation circuit 254 and diagnostic circuit 256 are embodied as machine or computer-readable media that is executable by a processor, such as remote processor 242. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the data management circuit 252, simulation circuit 254 and diagnostic circuit 256 are embodied as hardware units, such as electronic control units. As such, data management circuit 252, simulation circuit 254 and diagnostic circuit 256 may be embodied as one or more circuitry components including, but not limited to, processing circuitry, network interfaces, peripheral devices, input devices, output devices, sensors, etc. In some embodiments, data management circuit 252, simulation circuit 254 and diagnostic circuit 256 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, data management circuit 252, simulation circuit 254 and diagnostic circuit 256 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The data management circuit 252, simulation circuit 254 and diagnostic circuit 256 may also include programmable hardware devices such as field programmable gate arrays, programmable array logic, programmable logic devices or the like. The data management circuit 252, simulation circuit 254 and diagnostic circuit 256 may include one or more memory devices for storing instructions that are executable by the processor(s) of the data management circuit 252, simulation circuit 254 and diagnostic circuit 256. The one or more memory devices and processor(s) may have the same definition as provided below with respect to the remote memory device 244 and remote processor 242.

In some hardware unit configurations, the data management circuit 252, simulation circuit 254 and diagnostic circuit 256 may be geographically dispersed throughout separate locations. Alternatively and as shown, data management circuit 252, simulation circuit 254 and diagnostic circuit 256 may be embodied in or within a single unit/housing, which is shown as the remote system 18. Although shown in the embodiment of FIG. 2 as a singular, stand-alone computing system, one of ordinary skill in the art will appreciate that, in some embodiments, the remote system 18 may comprise distributed physical or virtual systems or resources. The remote system 18 may be a cloud computing environment (such that processing for the circuits of the remote system 18 is distributed across multiple resources) and/or may include virtualized components (such that a virtualized server, virtualized memory, etc. used by the remote system 18 are part of a resource shared by the remote system 18 with other computing systems). Accordingly, in some embodiments, the remote system 18 may include one or more virtual hosts, virtual servers, etc. such that the remote system 18 may share physical storage, hardware, and other resources with other virtual machines. Further, in some embodiments, virtual resources included in or accessible to the remote system 18 may include cloud computing resources such that the remote system 18 may rely on distributed processing across more than one physical processor, distributed memory, etc. As used herein, the term "resource" generally refers to a physical or virtualized (for example, in cloud computing environments) computing resource needed to execute computer-based operations. Examples of computing resources include computing equipment or device (physical or virtualized server, host, router, switch, etc.), storage, memory, executable (application, service, and the like), data file or data set (whether permanently stored or cached), and/or a combination thereof (for example, a set of computer-executable instructions stored in memory and executed by a processor, computer-readable media having data stored thereon, etc.). In one example embodiment, a computing infrastructure used to practice the teachings of the present disclosure includes a plurality of computing resources, each having up to 8 GB RAM and, all together, comprising approximately 300 processors, each processor having a 1.9 GHz processor speed. However, one skilled in the art will appreciate that, in various other embodiments, more or less memory may be required or used to run the computer-based simulations, more or fewer processors may be required or used, processor speed may vary according to the state of technology, and/or all or some of the memory, processor(s) and the like may be implemented as virtualized resources.

In the example shown, the remote system 18 includes the remote processing circuit 240 having the remote processor 242 and the remote memory device 244. The remote processing circuit 240 may be structured or configured to execute or implement the instructions, commands, and/or control processes described herein with respect to the data management circuit 252, simulation circuit 254 and diagnostic circuit 256. The depicted configuration represents the data management circuit 252, simulation circuit 254 and diagnostic circuit 256 as machine or computer-readable media. However, as mentioned above, this illustration is not meant to be limiting as the present disclosure contemplates other embodiments where all or some of the data management circuit 252, simulation circuit 254 and diagnostic circuit 256 are configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the remote processor 242) may be implemented or performed with a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor or any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the data management circuit 252, simulation circuit 254 and diagnostic circuit 256 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The remote memory device 244 (e.g., memory, memory unit, storage device) may include one or more devices (e.g., RAM, ROM, Flash memory, hard disk storage) for storing data and/or computer code for completing or facilitating the various processes, layers and modules described in the present disclosure. The remote memory device 244 may be communicably connected to the remote processor 242 to provide computer code or instructions to the remote processor 242 for executing at least some of the processes described herein. Moreover, the remote memory device 244 may be or include tangible, non-transient volatile memory or non-volatile memory. Accordingly, the remote memory device 244 may include database components, object code components, script components, or any other type of information structure for supporting the various activities and information structures described herein.

Figure 3:
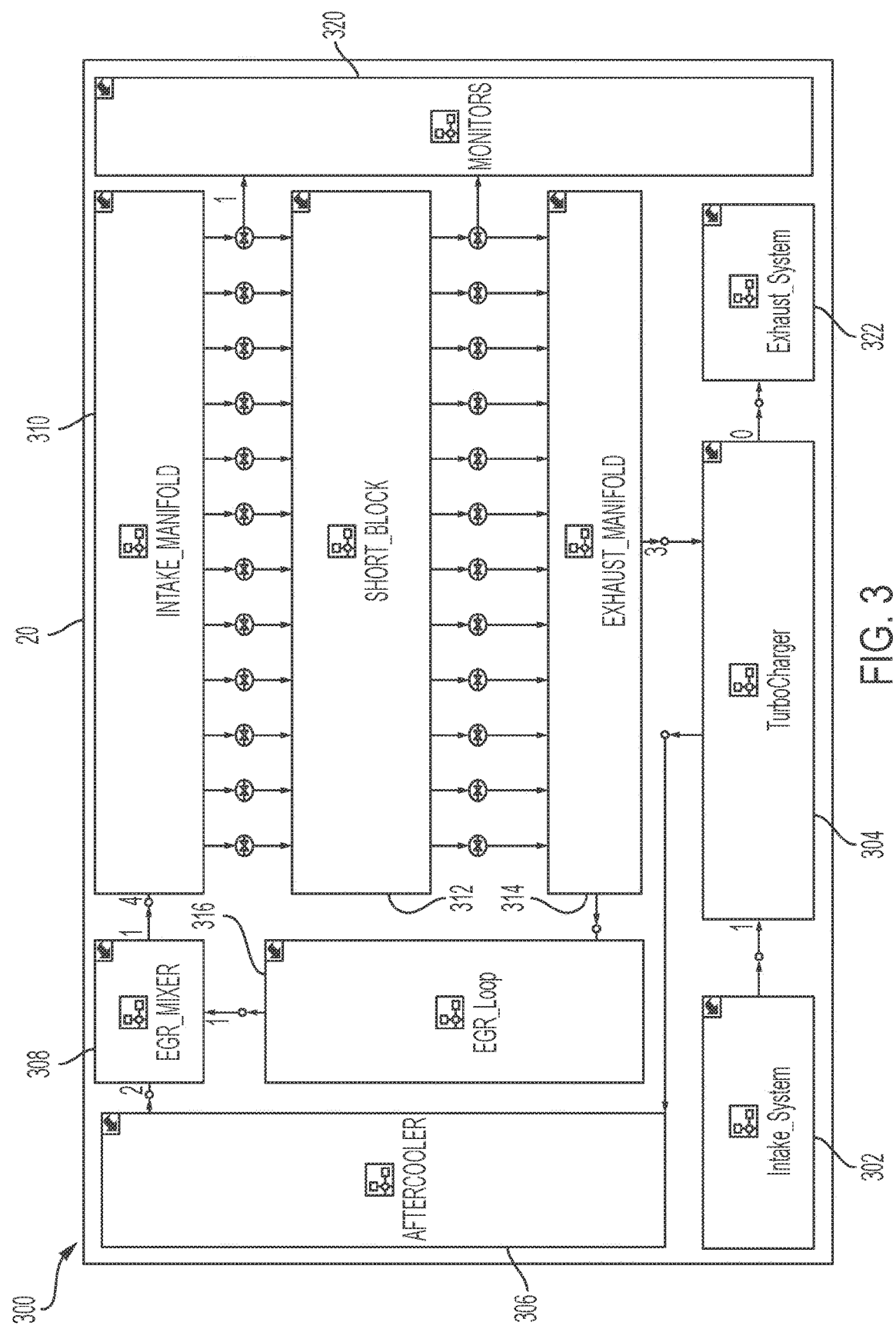
FIG. 3 is schematic diagram of a digital twin for an engine of the vehicle of FIG. 1, where the digital twin is associated with the controller of the remote system of FIG. 1, according to some embodiments.

Referring now to FIG. 3, a schematic diagram of aspects of example digital twin 20 for an engine 16 of the vehicle of FIG. 1 is shown, according to an example embodiment. The digital twin 20 is structured to include various circuits that correspond to all or some of the on-board systems of the vehicle 10 and/or engine 16. As shown, an example digital twin 20 includes circuits to simulate various aspects of the air intake and exhaust system of the engine 16 of vehicle 10. For example, the digital twin 20 may include an intake system circuit 302, a turbocharger circuit 304, an aftercooler 306, an exhaust-gas-recirculation (EGR) mixer circuit 308, an intake manifold circuit 310, a short block circuit 312, an exhaust manifold circuit 314, an EGR loop circuit 316, monitor circuit 320, and exhaust system circuit 322. Each of these circuits is structured to receive, process, and run simulations for the parts and operating parameters for each respective physical or electronic system or component. For example, the exhaust manifold circuit 314 is structured to virtually recreate and estimate the operations of a physical exhaust manifold of the vehicle 10 (as well as its upstream and downstream systems). A physical exhaust manifold in the vehicle 10 may be structured to collect streams of exhaust gases from multiple cylinders of the engine 16 into one pipe. A physical exhaust manifold may include a housing, a gasket, a heat shield, and/or one or more sensors disposed proximate to the manifold or at various locations within the manifold. The sensors may include temperature sensors, pressure sensors, oxygen sensors and the like. Various fault conditions associated with a physical exhaust manifold may include a crack in the manifold, a leak in the gasket, sensor failure, etc. Various fault conditions associated with upstream or downstream systems relative to the exhaust manifold may include an EGR crossover pipe leak, an EGR valve failure, a turbocharger failure, etc. The exhaust manifold circuit 314 is structured to diagnose the type or failure (physical or electronic component within the physical manifold) and pinpoint the source of the failure using information provided by one or more sensors within the exhaust manifold. The exhaust manifold circuit 314 may also be structured to diagnose at least in part the type or failure (physical or electronic component upstream or downstream of the manifold) and pinpoint the source of the failure using the above information in conjunction with information provided by sensors positioned upstream or downstream of the exhaust manifold.

More generally, the circuits included in the digital twin 20 may correspond to various components and systems associated with the engine 16 and/or an aftertreatment system of vehicle 10. These circuits may be implemented as part of the simulation circuit 254 of the remote control system 250 of FIG. 2. In some embodiments, the remote control system 250 is a cloud-based computing environment, and each or some of the circuits shown in FIG. 3 may have its own dedicated physical or virtualized resource, such as memory, processor, server, and the like. In some embodiments, the digital twin 20 is structured to run computer-based simulations for each circuit shown in FIG. 3 concurrently with simulations for other circuits shown in FIG. 3 so as to reduce the total amount of processing time required by the remote system 18 to generate each computer-based simulation.

Figure 4:
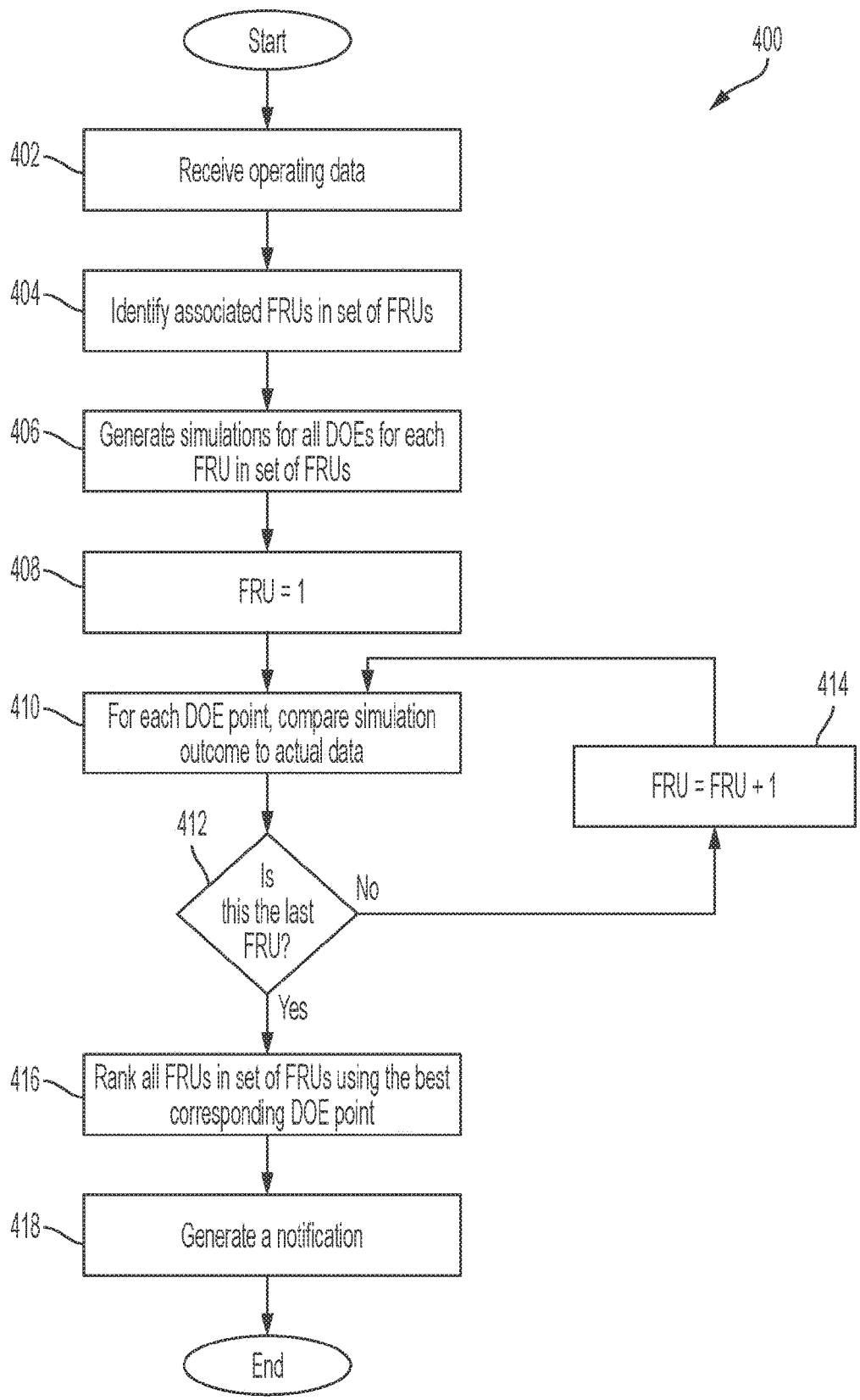
FIG. 4 is a flow diagram of a method of operation of the remote system of FIG. 1 for identifying one or more FRUs for the engine of the vehicle of FIG. 1, according to some embodiments.

Referring now to FIG. 4, a flow diagram of a method 400 of operation of the remote system 18 of FIG. 1 for identifying one or more FRUs for the engine 16 of the vehicle 10 of FIG. 1 is shown, according to some embodiments. Generally, an FRU may include a physical and/or electronic component, or a combination thereof. Various physical components may include actuators, pipes, valves, housings, adapters, sensors (e.g., a temperature sensor, a pressure sensor, an NOx sensor), injectors, heaters, combinations thereof (e.g., turbochargers) and the like. Various electronic parts may include various control units (e.g., combinations of processors, memory, and/or circuits disposed on a circuit board, such as engine control units (ECU), where an example ECU may include an engine control module (ECM), a powertrain control module (PCM), a brake control module (BCM), a transmission control module (TCM), a battery management system (BMS), etc.). Various electronic parts may further include electronic programmable sensors.

As shown according to an example embodiment, the method 400 includes operations (e.g., computer-based operations) to receive operating data, identify the FRUs associated with the operating data, and generate computer-based simulations for a plurality of DoE points for each FRU in the set of associated FRUs. For each FRU and DoE point, a simulation outcome is compared to actual data (e.g., historical data for the corresponding FRU received from the vehicle 10). Based on the comparison, one or more DoE points from the computer-based simulation are selected for each FRU in the set of FRUs. These DoE points are ranked and, based on the ranking, one or more of the most probable failures are identified. In some embodiments, the method 400 comprises generating a notification comprising the one or more most probable failures and transmitting the notification to a user computing device.

In an example embodiment, the operations of method 400 include receiving operating data from the vehicle 10 of FIG. 1 by the remote system 18 (at 402). The remote system 18 is structured to receive the data packets from the telematics circuit 156 of the vehicle controller 14. The data packets may include operating information associated with the engine 16 or other components of the vehicle 10, such as information provided by some or all of the sensors in the sensor array 22 and actuation commands and other data provided by the actuators 26 of FIG. 2.

In some embodiments, the operating data is received at predetermined time intervals, such as every 10 ms, 100 ms, 1 sec, 30 sec, 1 min, 5 min, etc. In some embodiments, every sensor and actuator reading for a particular period of time (e.g., for a particular hour or day) is transmitted by the telematics circuit 156 to the data management circuit 252 of the remote system 18. In some embodiments, the readings are periodically sampled at different predetermined time intervals. In some embodiments, only a subset of the periodically sampled readings is sent to the data management circuit 252 of the remote system 18. For example, the telematics circuit 156 of the vehicle 10 may be structured to sample data from the sensors and actuators at a first predetermined time interval (10 ms, 100 ms, 1 sec, 30 sec, 1 min, 5 min, etc.) but send the data to the remote system 18 at a less frequent second predetermined time interval.

In some embodiments, the data management circuit 252 is structured to unpack (e.g., decode, parse, etc.) the packets of information to extract individual values. For example, the packets may contain fixed-width numerical or alphanumeric strings where each character position identifies corresponds to a specific data elements, the packets may contain delimited data where predetermined special characters are used as delimiters (e.g. pipe-delimited, comma-delimited, etc.), the packets may contain a multidimensional data item containing multiple attributes corresponding to various properties of the data, etc.

The operations of method 400 include (at 404) identifying the FRUs associated with the particular data received from the universe of all available FRUs associated, via the digital twin 20, with the vehicle 10. In some embodiments, the remote system 18 comprises a directory of all FRUs associated with the vehicle 10. The vehicle 10 may be configured to only send a subset of data for particular parts or subsystems of the vehicle 10 (e.g., only for the air intake and exhaust system as shown according to an aspect of digital twin 20 in FIG. 3). The data management circuit 252 of the remote system 20 may be structured to determine which FRUs are associated with the sensors and/or actuators that provided the data. For example, the remote system 20 may comprise a database that stores an associative mapping between a sensor identifier and/or actuator identifier and its associated FRU. Thus, in some embodiments, the telematics circuit 156 is structured to include in the set of data received by the remote system 18 identifying information for the sensors and/or actuators that provided particular data points, locations of the sensors and/or actuators, the type of the sensor and/or actuator, etc.

The operations of method 400 include (at 406) include generating computer-based simulations for each DoE point in the set of FRUs associated with received data. More specifically, the simulation circuit 254 structured to virtually recreate the control logic of the engine control circuit 154 of the vehicle controller 14 and generate computer-based simulations of failures for parts of the vehicle 10 based on the sensor and actuator data received from the telematics circuit 156.

Figure 6:
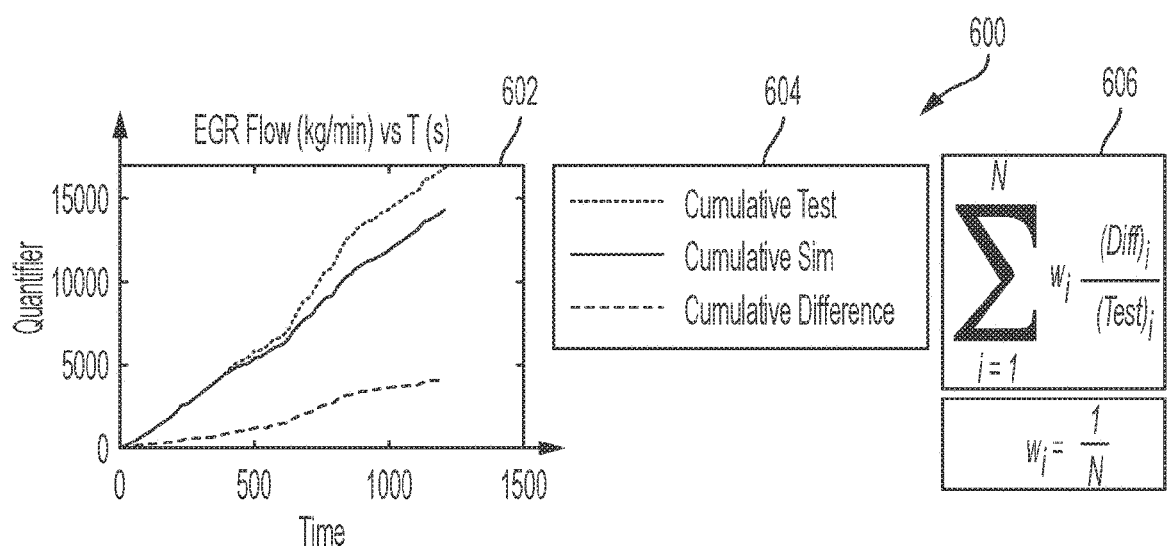
FIG. 6 is a graph showing the output of a computer-based simulation executed to estimate performance of an example part, such as a FRU, from a plurality of parts associated with the engine of the vehicle of FIG. 1, according to some embodiments.

To that end, the simulation circuit 254 structured to use the sensor information, actuation information, and control parameters in computer-based simulation and to generate one or more output (expected) values for performance parameters of the vehicle 10. A non-exhaustive list of performance parameters includes fresh air flow (measured in kg/min), torque (measured in lb/ft), turbo speed (measured in RPM), intake manifold pressure (IMP) (measured in kPa), flow rate (e.g., EGR flow, charge flow measured in kg/min), air compressor pressure (measured in kPa), air compressor temperature (measured in degrees Kelvin), EGR cooler inlet/outlet pressure (measured in kPa), and throttle inlet/outlet pressure (measured in kPa). The values for performance parameters are estimated over a time period, as shown in FIG. 6, such that a plurality of time point-related values are estimated for each performance parameter.

In an example embodiment, each computer-based simulation in the set of computer-based simulations for each part includes a plurality of predicted outcomes for each performance parameter, where each predicted outcome is associated with a design-of-experiments (DoE)-based simulation for the performance parameter. In one example embodiment, each DoE scenario corresponds to a degradation level for a particular part, where the degradation level is represented by the performance parameter. As an example, for some parts, such as valves and pipes, part failures may be due to leaks, partial pathway obstructions, and the like, and each DoE in the set of DoEs for the part may correspond to a degradation level expressed in percentage terms (such as a 10% leak, a 10% obstruction, and the like.). For instance, the EGR flow rate may vary according to a degradation level (e.g., how significant a potential obstruction is, the severity of an EGR pipe leak, etc.). Each or some degradation levels in the universe of expected degradation levels is a particular DoE scenario, and each DoE scenario is implemented as a separate computer-based simulation for the part.

The operations of method 400 include (at 408-414) utilizing the outcomes of computer-based simulations for each FRU (obtained at 406) for diagnostic analysis of the physical and/or electronic parts of vehicle 10. More specifically, the diagnostic circuit 256 of the digital twin 20 is structured to determine (at 410) an expected error value of each computer-based simulation (DoE scenario), as further illustrated in FIG. 6. Based on the expected error value, the diagnostic circuit 256 is structured to select from a set of computer-based simulations for the part a most likely DoE scenario. Referring again to the EGR system diagnostics example from 406 and as shown further in FIG. 7, each of the computer-based simulations (DoE scenarios) may correspond to a degradation level (failure magnitude) for a component. For example, an EGR valve or an EGR crossover pipe may be expected, based on a set of computer-based simulations generated by the simulation circuit 254, to have a 10% to a 90% leak. The most likely degradation level is determined by the diagnostic circuit 256 based on the magnitude of the expected error value, such that the DoE with the smallest error value is determined to have the greatest predictive accuracy.

Figure 8:
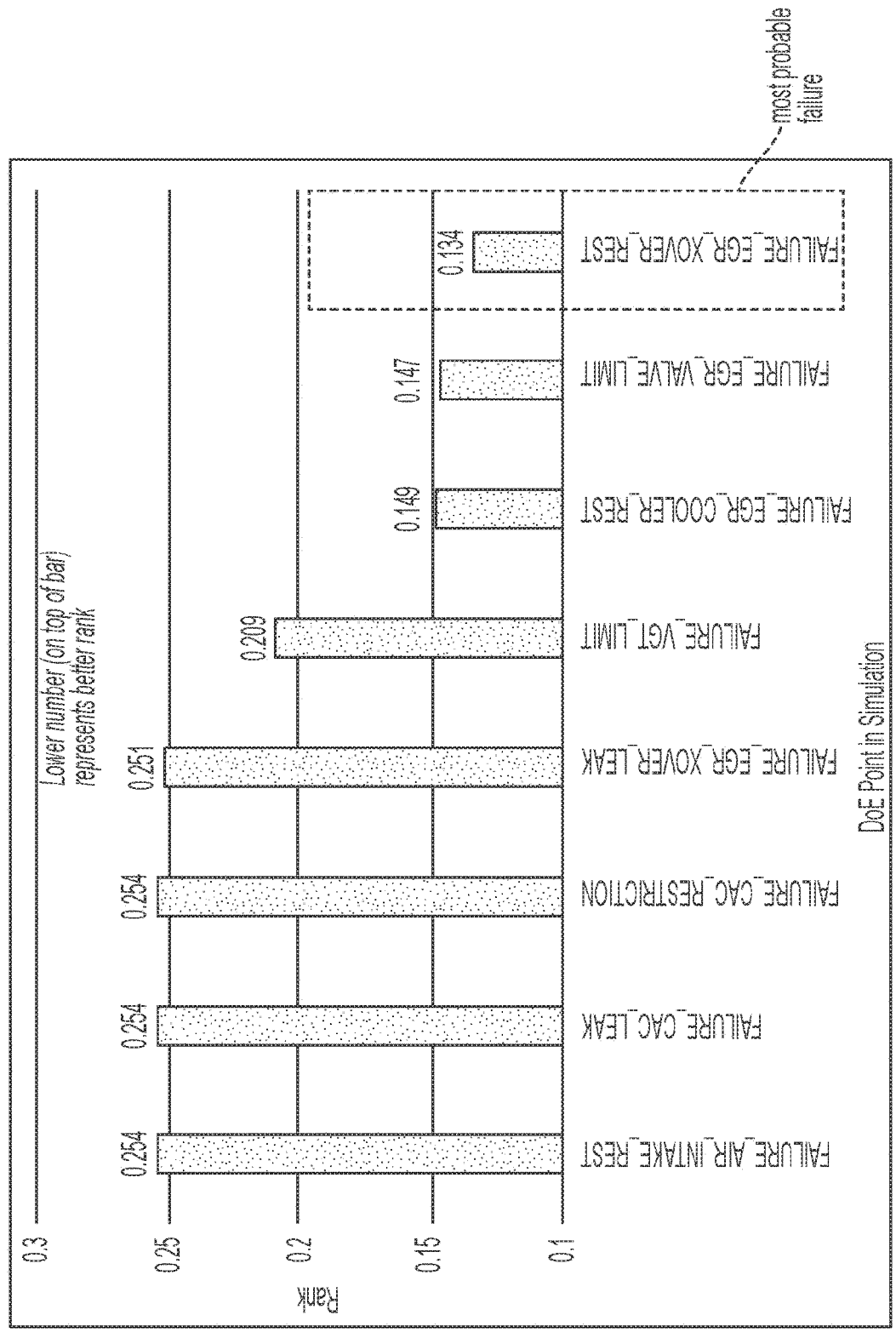
FIG. 8 is a graph showing a ranked list of predicted part failures for at least some parts from the plurality of parts of the engine of the vehicle of FIG. 1, according to some embodiments.

The operations of method 400 include (at 416) ranking the most predictive computer-based simulation (determined at 410) for each FRU in the set of FRUs corresponding to the data set received at 402, as described further in reference to FIG. 8. Based on the ranking, the diagnostic circuit 256 is structured to identify top N most probable failures for the set of FRUs. For example, as shown further in FIG. 8, an example data set received from the telematics circuit of vehicle 10 may have been determined to correspond to the following potential fault conditions associated with the air intake and exhaust system of the engine 16 of vehicle 10, ranked from most likely to least likely: a restriction in the EGR crossover pipe, an EGR valve failure (e.g., EGR valve sticks partially or fully open or closed), an EGR cooler restriction, a variable-geometry turbocharger (VGT) failure, a leak in the EGR cross-over pipe, a restriction in the charge air cooler, a leak in the charge air cooler, and a restriction in the air intake path.

The operations of method 400 include (at 418) generating an electronic notification based on the ranked computer-based simulations as described, for instance, in reference to FIG. 2. In some embodiments, the data management circuit 252 is structured to transmit the notification to a computing system operated by a user of the vehicle 10, a service provider, an insurance provider, etc.

Figure 5:
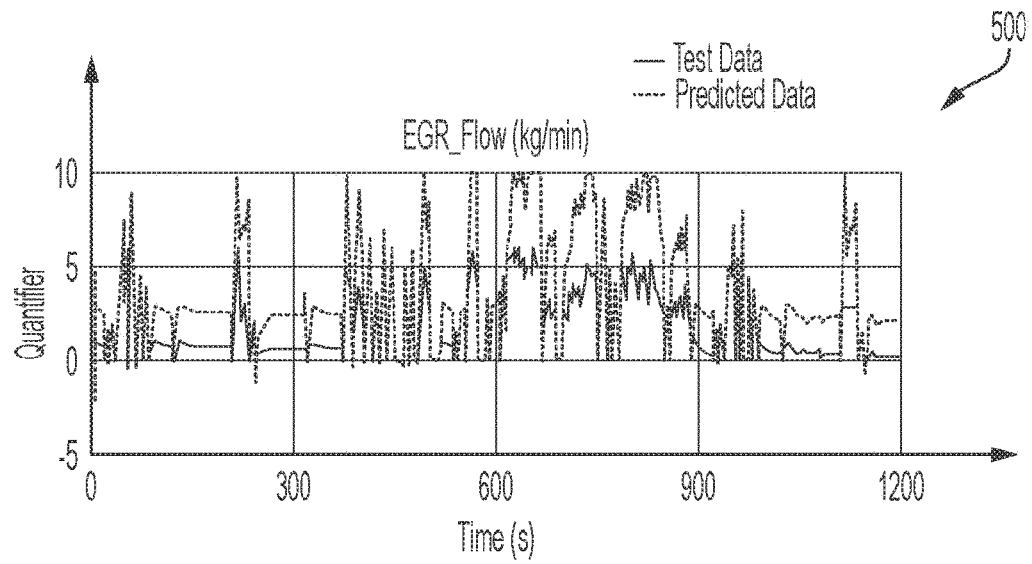
FIG. 5 is a graph showing the output of a computer-based simulation for checking the received data for potential inconsistencies with predicted outcomes for normal operation, according to some embodiments.

Referring now to FIG. 5, a graph showing the output of a computer-based simulation 500 for checking the received data for potential inconsistencies with predicted outcomes for normal operation is shown, according to an example embodiment. In some embodiments, some or all of the operations illustrated in FIG. 5 are performed only to validate the operation of the simulation circuit of the digital twin 20 (e.g., in the validation or test mode) and are omitted in actual operation of the digital twin 20 in a production system.

As shown, the computer-based simulation 500 includes predicted data for a period of time. The predicted data provides estimations for a particular performance parameter (as shown, the EGR flow rate) but one of ordinary skill in the art will appreciate that a similar simulation may be executed for another performance parameter or a different time period. The predicted data is compared, at each time point, to the actual (test) data received from the sensors and actuators of the vehicle 10 (for example, at 402 of FIG. 4). In some embodiments, the remote system 18 is structured to store the actual data for a particular period (e.g., one hour, one day, one week, etc.) and the data outside these parameters may be truncated. Thus, advantageously and unlike conventional diagnostic systems, the remote system 18 makes historical sensor and actuation data available for diagnostic and simulation validation purposes.

The outcome of the simulation 500 may be used to validate the DoE design and the computer-based simulation for a particular FRU for the digital twin 20. Additionally, if the DoE design and the computer-based simulation for a particular FRU have already been validated for a first digital twin 20 for a first vehicle 10, the outcome of the simulation 500 may be used to predict FRU failures, by a second digital twin 20, for a different second vehicle 10, which may include a different installation of the same part. Therefore, the remote system 18 may be enabled to analyze data across multiple parts for multiple vehicles 10 to generate or predict a fault diagnosis and/or to generate a proactive service recommendation for a particular vehicle.

Figure 7:
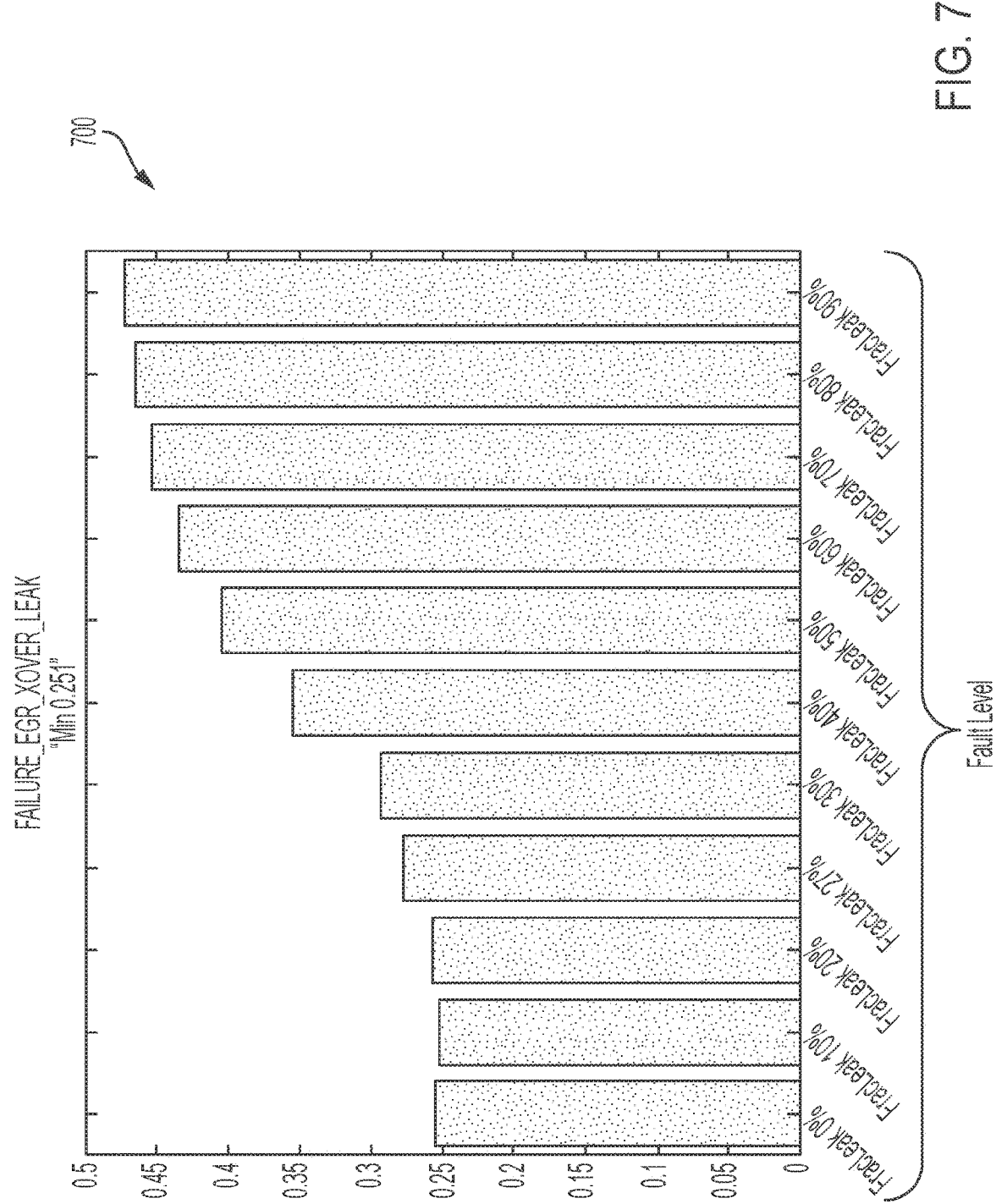
FIG. 7 is a graph showing the output of a range of degradation level for a particular part from the plurality of parts of the engine of the vehicle of FIG. 1, according to some embodiments.

Referring now to FIG. 6 and FIG. 7, outputs of computer-based validation outcomes of simulations are shown, according to an example embodiments.

FIG. 6 is a graph showing the output of a computer-based simulation executed to estimate (e.g., calculate, project) the performance and/or degradation level of an example part (e.g., an FRU) from the plurality of parts associated with the engine of the vehicle of FIG. 1. As described in reference to FIG. 4, a set of FRUs corresponding to actual received sensor and actuator data is selected from a universe of all available (e.g., digitally simulated) FRUs for vehicle 10. For each performance parameter of each FRU, a plurality of computer-based simulations is executed, where each simulation is a DoE scenario that corresponds to a particular fault type or degradation level.

The computer-based error quantification process illustrated in FIG. 6 is performed for each such computer simulation. As shown in graph 602, cumulative actual (test) values, received from the telematics circuit 156 of the vehicle controller 14 of vehicle 10, are plotted over a particular period of time. In some embodiments, these actual values may be saved in a storage media of the remote system 18 or may be retained in volatile memory for a predetermined period of time necessary to collect the data and generate the simulations. The cumulative actual values are plotted against the cumulative estimated values generated by the computer-based simulations.

To determine the expected error value, a cumulative value of the difference between actual and estimated data points for a particular point in time is taken. The cumulative value is normalized. A weighted average of this normalized quantity is determined. The expected error is calculated according to the equation 606:

$$\sum_{i=1}^{N} w_i \frac{(Diff)_i}{(Test)_i},$$

where i is the number of each successive simulation, N is the total number of simulations, Diff(i) is the cumulative difference between simulated and actual values, Test(i) is the cumulative actual value, and $$w_i = \frac{1}{N}.$$

FIG. 7 is a graph showing the output of a range of degradation level levels for the particular part from the plurality of parts of the engine of the vehicle of FIG. 1. Referring again to the EGR system diagnostics example from 406 of FIG. 4, each of the computer-based simulations (DoE scenarios) may correspond to a degradation level (failure magnitude) for a component. For example, an EGR valve or an EGR crossover pipe may be expected, based on a set of computer-based simulations generated by the simulation circuit 254, to have a 10% to a 90% leak. The most likely degradation level is determined by the diagnostic circuit 256 based on the magnitude of the expected error value, such that the DoE with the smallest error value (here, 0.251 units) is determined to have the greatest predictive accuracy.

Referring now to FIG. 8, a graph showing a ranked list of predicted part failures for at least some parts from the plurality of parts of the engine of the vehicle of FIG. 1 is shown, according to some embodiments. Based on the ranking, the diagnostic circuit 256 is structured to identify top N most probable failures for the set of FRUs. In an example embodiment, the ranking comprises identifying the smallest error for each DoE for an FRU as described in reference to FIG. 6, selecting the corresponding FRU and then ranking the resulting set of FRUs, based on the magnitude of the error for each, from smallest (most likely failure) to largest (least likely failure.)

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members. For example, circuit A "coupled" to circuit B may signify that the circuit A communicates directly with circuit B (i.e., no intermediary) or communicates indirectly with circuit B (e.g., through one or more intermediaries).

While various circuits with particular functionality are shown in the Figures, it should be understood that the controller described herein may include any number of circuits for completing the functions described herein. Additional circuits with additional functionality may also be included. Further, it should be understood that the controllers may further control other activity beyond the scope of the present disclosure.

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, it should be understood that the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally or remotely (e.g., as part of a remote server such as a cloud based server). To that end, a "circuit" as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computing system comprising a processor and a memory having computer-executable instructions stored therein that, when executed by the processor, are structured to cause the computing system to perform operations comprising:

receiving operating data provided by a telematics circuit associated with a vehicle system that is remotely disposed relative to the computing system, the operating data comprising information from at least one of at least one sensor or at least one actuator within the vehicle system;

based on the operating data, identifying a plurality of field-replaceable units (FRUs) of the vehicle system, each FRU of the plurality of FRUs comprising one or more components within the vehicle system;

generating a computer-based simulation for diagnostic analysis of each FRU of the plurality of FRUs;

determining an expected error value corresponding to at least one degradation level for each FRU of the plurality of FRUs based on a comparison of the computer-based simulation with the operating data;

identifying a most probable failure corresponding to a FRU of the plurality of FRUs in the vehicle system by ranking the expected error value corresponding to the at least one degradation level for each of the plurality of FRUs;

generating an electronic notification comprising data associated with the most probable failure corresponding to the FRU in the vehicle system; and transmitting the electronic notification to a computing device to indicate the most probable failure in the vehicle system.

2. The computing system of claim 1, wherein the instructions, when executed by the processor, are further structured to cause the computing system to perform operations comprising:

validating each computer-based simulation by determining the expected error value of each computer-based simulation based on the comparison with the operating data of the vehicle system; and
ranking each computer-based simulation according to the expected error value.

3. The computing system of claim 2, wherein the instructions, when executed by the processor, are further structured to cause the computing system to perform operations comprising determining the expected error value according to the equation $$\sum_{i=1}^{N} w_i \frac{(Diff)_i}{(Test)_i}$$

where i is a number of each successive computer-based simulation for a degradation level for each FRU, N is a total number of successive computer-based simulations for the degradation level, Diff(i) is a cumulative difference between an output value of each computer-based simulation for a predetermined time period and its corresponding actual value determined based on the operating data, Test(i) is a cumulative actual value for the predetermined time period, and $$w_i = \frac{1}{N}.$$

4. The computing system of claim 1, wherein the engine system is a first engine system, the FRU is a first FRU, and wherein the instructions, when executed by the processor, are further structured to cause the computing system to perform operations comprising:
receiving additional operating data provided by a second telematics circuit associated with a second engine system;
based on the additional operating data, identifying a second FRU associated with the second engine system, wherein the second FRU and the first FRU correspond to a particular part; and
generating the computer-based simulation corresponding to at least one degradation level for the first FRU, wherein the computer-based simulation is based on the additional operating data for the second FRU.

5. The computing system of claim 1, wherein the notification comprises a standardized code corresponding to the most probable failure.

6. The computing system of claim 5, wherein the standardized code is an OBD-11 code.

7. The computing system of claim 5, wherein the standardized code is augmented to include an encoded error descriptor determined based on the computer-based simulation.

8. The computing system of claim 5, wherein the notification comprises a service recommendation.

9. The computing system of claim 1, wherein the operating data further comprises at least one actuation command.

10. A method comprising:
receiving, by a computing system, operating data provided by a telematics circuit associated with a vehicle system that is remotely disposed relative to the computing system, the operating data comprising information from at least one of at least one sensor or at least one actuator within the vehicle system;
based on the operating data, identifying, by the computing system, a plurality of field-replaceable units (FRUs) of the vehicle system, each FRU of the plurality of FRUs comprising one or more components within the vehicle system;
generating, by the computing system, a computer-based simulation for diagnostic analysis of each FRU of the plurality of FRUs;
determining, by the computing system, an expected error value corresponding to at least one degradation level for each FRU of the plurality of FRUs based on a comparison of the computer-based simulation with the operating data;
identifying, by the computing system, a most probable failure corresponding to a FRU of the plurality of FRUs in the vehicle system by ranking the expected error value corresponding to the at least one degradation level for each of across the plurality of FRUs;
generating, by the computing system, an electronic notification comprising data associated with the most probable failure corresponding to the FRU in the vehicle system; and
transmitting, by the computing system, the electronic notification to a computing device to indicate the most probable failure in the vehicle system.

11. The method of claim 10, wherein the method further comprises:
validating, by the computing system, each computer-based simulation by
determining the expected error value of each computer-based simulation based on the comparison with the operating data of the vehicle system; and
ranking, by the computing system, each computer-based simulation according to the expected error value.

12. The method of claim 11, wherein the method further comprises determining, by the computing system, the expected error value according to the equation $$\sum_{i=1}^{N} w_i \frac{(Diff)_i}{(Test)_i}$$

where i is a number of each successive computer-based simulation for a degradation level for each FRU, N is a total number of successive computer-based simulations for the degradation level, Diff(i) is a cumulative difference between an output value of each computer-based simulation for a predetermined time period and its corresponding actual value determined based on the operating data, Test(i) is a cumulative actual value for the predetermined time period, and $$w_i = \frac{1}{N}.$$

13. The method of claim 10, wherein the engine system is a first engine system, the FRU is a first FRU, and wherein the method further comprises:
receiving, by the computing system, additional operating data provided by a second telematics circuit associated with a second engine system;
based on the additional operating data, identifying, by the computing system, a second FRU associated with the second engine system, wherein the second FRU and the first FRU correspond to a particular part; and generating the computer-based simulation corresponding to at least one degradation level for the first FRU, wherein the computer-based simulation is based on the additional operating data for the second FRU.

14. The method of claim 10, wherein the notification comprises a standardized code corresponding to the most probable failure, wherein the standardized code is augmented to include an encoded error descriptor based on the computer-based simulation.

15. The method of claim 10, wherein the operating data further comprises at least one actuation command.

16. A computing system, comprising:
a circuit comprising one or more processors coupled with memory, configured to:
receive operating data from a telematics circuit associated with a vehicle system that is remotely disposed relative to the computing system, the operating data comprising information from at least one of at least one sensor or at least one actuator within the vehicle system;
based on the operating data, identify a plurality of field-replaceable units (FRUs) of the vehicle system, each FRU of the plurality of FRUs comprising one or more components within the vehicle system; and
generate a computer-based simulation for diagnostic analysis of each FRU of the plurality of FRUs;
determine an expected error value corresponding to at least one degradation level for each FRU of the plurality of FRUs based on a comparison of the computer-based simulation with the operating data;
identify a most probable failure corresponding to a FRU of the plurality of FRUs in the vehicle system by ranking the expected error value corresponding to the at least one degradation level for each of the plurality of FRUs;
generate an electronic notification comprising data associated with the most probable failure corresponding to the FRU in the vehicle system; and
transmit the electronic notification to a computing device to indicate the most probable failure in the vehicle system.

17. The computing system of claim 16, wherein the circuit is further configured to:

validate each computer-based simulation by determining the expected error value of each computer-based simulation based on the comparison with the operating data of the vehicle system; and rank each computer-based simulation according to the expected error value.

18. The computing system of claim 17, wherein the circuit is further configured to determine the expected error value according to the equation $$\sum_{i=1}^{N} w_i \frac{(Diff)_i}{(Test)_i}$$

where i is a number of each successive computer-based simulation for a degradation level for each FRU, N is a total number of successive computer-based simulations for the degradation level, Diff(i) is a cumulative difference between an output value of each computer-based simulation for a predetermined time period and its corresponding actual value determined based on the operating data, Test(i) is a cumulative actual value for the predetermined time period, and $$w_i = \frac{1}{N}.$$

19. The computing system of claim 16, wherein the engine system is a first engine system, the FRU is a first FRU, wherein the circuit is further configured to receive additional operating data provided by a second telematics circuit associated with a second engine system, and wherein the circuit is further configured to:
based on the additional operating data, identify a second FRU associated with the second engine system, wherein the second FRU and the first FRU correspond to a particular part; and
generate the computer-based simulation corresponding to at least one degradation level for the first FRU, wherein the computer-based simulation is based on the additional operating data for the second FRU.

20. The computing system of claim 16, wherein the notification comprises a standardized code augmented to include an encoded error descriptor determined based on the computer-based simulation.

* * * * *